Patented May 10, 1927.

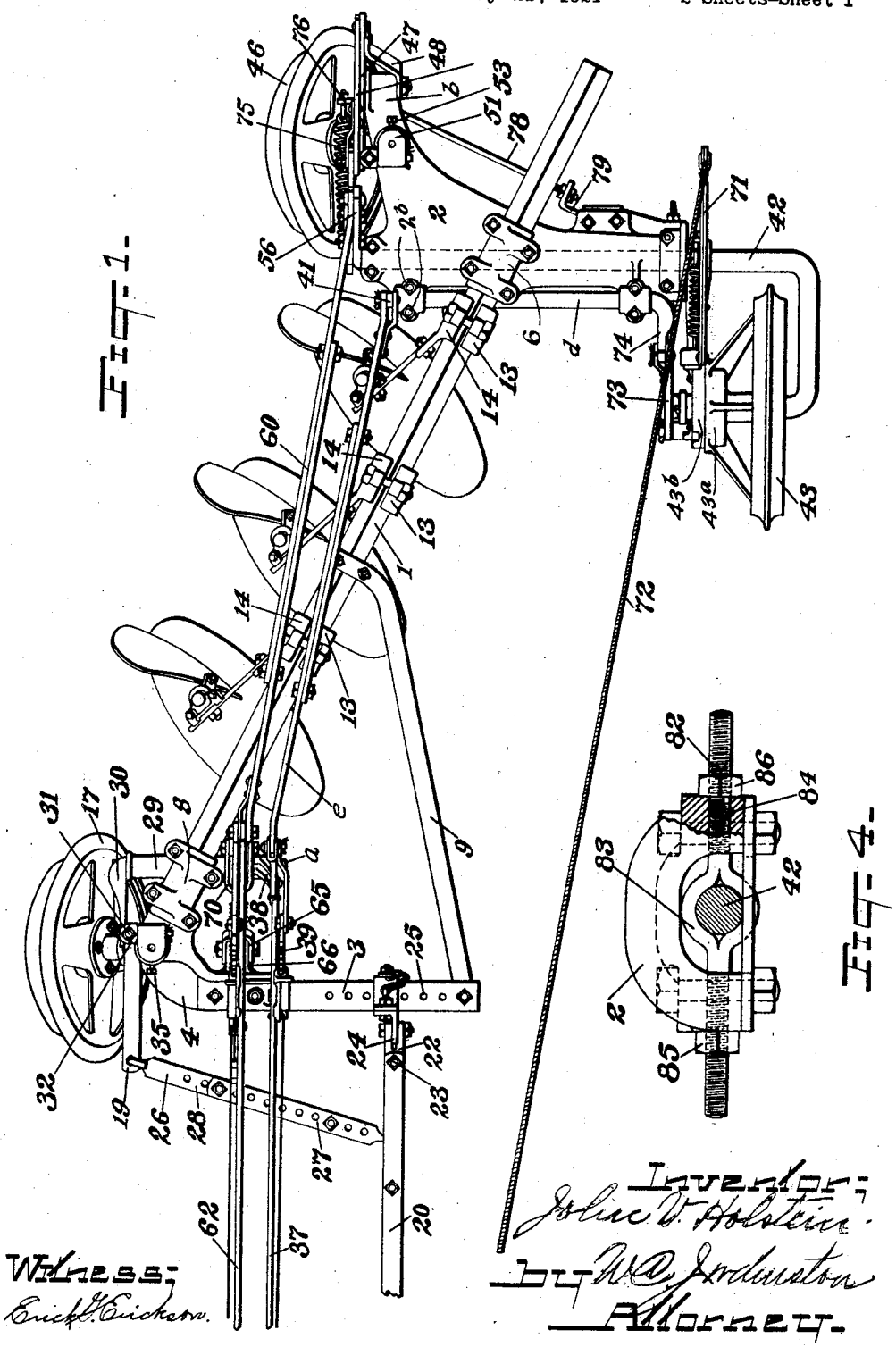

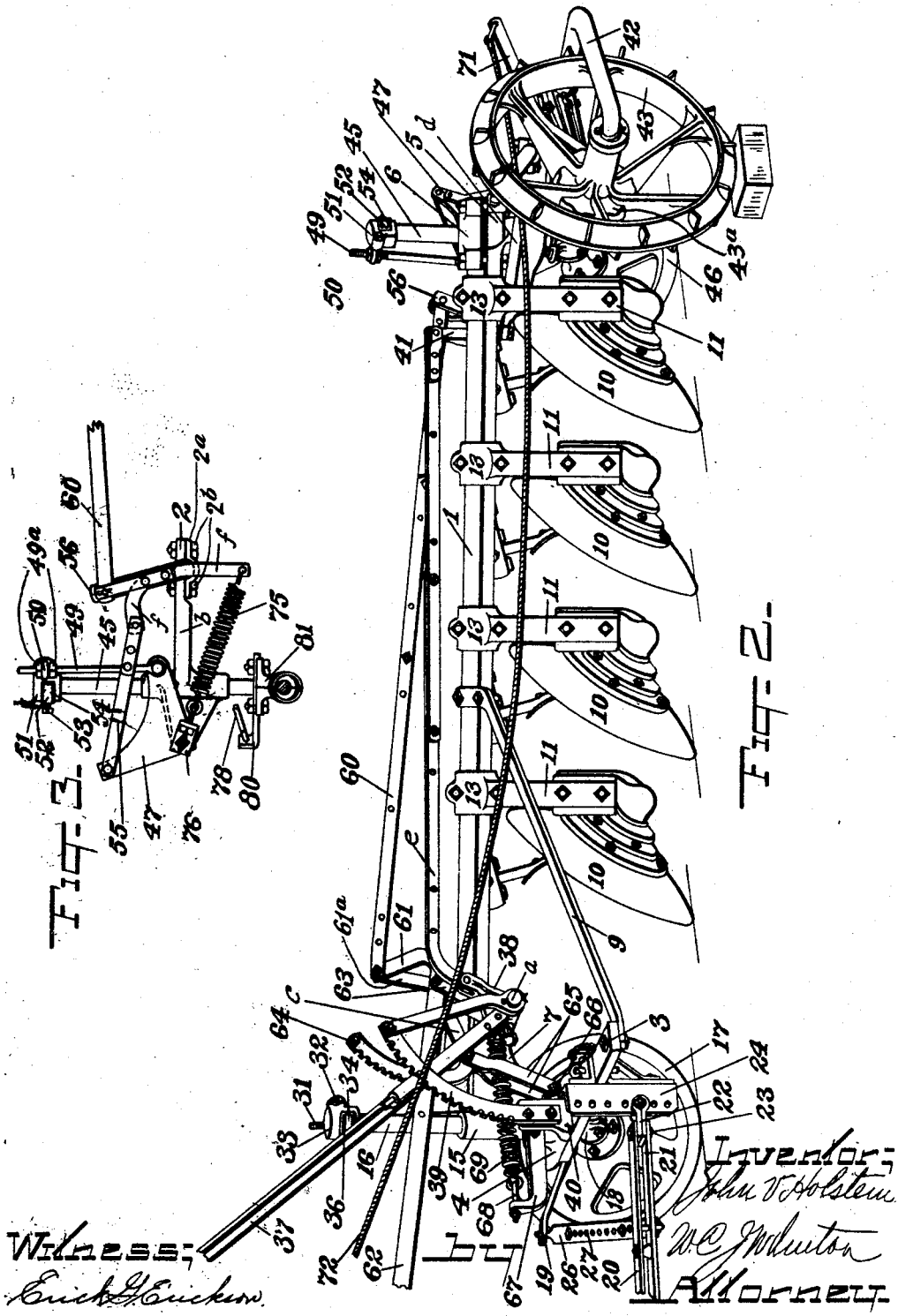

1,627,902

UNITED STATES PATENT OFFICE.

JOHN V. HOLSTEIN, OF MOLINE, ILLINOIS, ASSIGNOR TO DEERE & COMPANY, OF MOLINE, ILLINOIS, A CORPORATION OF ILLINOIS.

GANG PLOW.

Application filed July 21, 1921. Serial No. 486,455.

My invention relates to gang plows comprising a plurality of earth working devices such as disks or equivalent devices arranged to be adjusted in various ways to adapt the implement for various classes of work and for use under various soil conditions. It has for its object to provide improved means for supporting the earth working devices so they will be held securely and made capable of withstanding the strains to which they are subjected; to provide for conveniently adjusting them in various ways; to provide improved means for raising the earth working devices unitarily by power derived from one of the supporting wheels; to provide improved means for adjusting the earth working devices for regulating their working depth; to provide improved leveling means, and generally to improve the construction and operation of implements of this character in various other respects which will be hereinafter pointed out.

Referring to the drawings in which similar numerals indicate identical parts:—

Figure 1 is a plan view of a wheel supported gang plow embodying my invention. Figure 2 is a perspective view taken from the landward side of the plow and illustrating the position of the plow when in operation, but showing four plows instead of three as in Figure 1. Figure 3 is a detail view of the rear furrowwheel mounting and connected parts, and Figure 4 is a detail in part section illustrating an adjustment of the landwheel.

In the drawings I have shown my improvements as embodied in a disk plow having furrow wheels at the front and rear and a landwheel at the rear, the latter serving also as the means of supplying power by which the plow as a whole is raised from its operating to its carrying position, but I wish it to be understood that many of the features of improvement hereinafter described and pointed out in the claims may be applied to other sorts of plow structures. For convenience, however, I shall direct the description of such improvements to the structure as illustrated. In such illustrated construction the frame of the plow includes a rear casting 2, extending transversely at a right angle to the line of draft, a drawbar 3, parallel to the casting 2 and rigidly secured to a casting 4, and a beam 1 extending diagonally in a furrowward direction from the casting 2 to connection with the casting 4. The beam 1 is preferably square in cross section and is mounted in such a manner that the diagonals of the square are respectively vertical and horizontal, this disposition of the beam presenting the greatest resistance to vertical and horizontal strains. Moreover by making the beam substantially rectangular or square in cross section and arranging it in this way, the plow standards, and other parts of the plow structure which have to be secured to the beam, may be readily attached thereto by means of clamps and without the necessity of perforating the beam, which is objectionable, because of the weakening effect of such perforations. Besides my improved construction permits of ready adjustment of the standards or other attached parts longitudinally of the beam without limiting them to being placed in predetermined positions, as is the case where bolt holes must be provided for securing them in place, and without the necessity of dissociating the parts from the beam when making such adjustments. By arranging the beam so that its diagonals are in vertical and horizontal planes, the clamping devices are made more easily accessible, which is quite an advantage. The rear end of the beam 1 is secured in a block 5, preferably integral with the casting 2, by a cap 6 bolted to the block 5, and the forward end of the beam 1 is similarly secured on a rear extension 7 of the casting 4 by a cap 8 bolted thereon. A brace 9 is secured to the landward end of the drawbar 3, and extends rearwardly substantially in the line of the center of resistance to rigid connection with the beam 1 as shown in Figure 1.

The plows 10 which in the implement illustrated are disks of the usual type, but which may be earth working devices of various other sorts, are mounted respectively on standards. Each standard is secured to the beam 1 by clamps one part 13 of which is preferably integral with the standard, and the second part 14 of which is secured to the part 13 by suitable bolts which can be readily loosened to permit adjustment of the standards and the plows along the beam to regulate the width of furrow it is desired to cut.

On the casting 4 is a bearing 15 in which is slidably supported the vertical spindle 16 of a bent axle having a furrow wheel 17 journaled on its lower inclined end portion. A split elbow 18 is rigidly secured on the bend of the axle so that it is thereby held against turning thereon and bolted to said elbow is a forwardly extending bar 19 normally parallel with a draft bar, formed of parallel bars 20 and 21, having its rear end secured to a coupling 22 by a vertical pivot 23, and its forward end adapted to be attached to a tractor. The coupling 22 is pivotally connected to a clevis 24 bolted to the draw bar 3, the latter having a series of holes 25 for lateral adjustment of the clevis as occasion may require. A bar 26, composed of superimposed bars 27 and 28 bolted together, is provided with a series of holes whereby the length of the bar 26 can be readily changed when desired. The bar 26 connects the bar 19 with the draft bar and any lateral deviation of the latter from parallelism with the direct line of draft steers the furrow wheel 17 correspondingly.

Preferably integral with the casting 4 and extending transversely of the plow is a bearing 29, and journaled therein is a rock shaft $a$ the furrowward end 30 of which is bent to extend forwardly and is pivotally connected to a vertically disposed rod 31 which is threaded at its upper end and extends through the opening in an eye-bolt 32, being held from longitudinal movement therein in any suitable way as by nuts on said rod at opposite sides of the eye-bolt in the manner illustrated in Figure 3. The eye-bolt 32 is pivotally secured in a cap 33 loosely mounted on the upper end of the spindle 16 in order that the latter may turn freely therein; withdrawal of the spindle from the cap is prevented by a collar 34 which is rigidly secured to the spindle 16 by a set screw 35 which projects through a horizontal slot 36 in the cap 33.

A manually operable lever 37 is rigidly connected to one arm of a bell crank 38 pivotally mounted on the shaft $a$. A notched sector 39 is loosely supported on the landward end of the shaft $a$ and is fixedly secured to a bracket 40 rigidly mounted on the casting 4; the lever 37 is provided with the usual type of latch to engage with any one of the notches in the sector 39. Pivotally connected to the rearward angle of the bell crank 38 is a bar $e$ which extends rearwardly to an arm 41 on the furrowward end of a rock shaft $d$ and preferably integral therewith. The rock shaft $d$ is rotatably journaled in suitable bearings on the casting 2. On the landward or crank end of the axle 42 which, as best shown in Figure 1, extends transversely of the plow and is journaled in the casting 2 so as to be free to rock about a transverse axis, is mounted a landwheel 43 which is raised or lowered relative to the frame by operating the lever 37 to rock said axle, as will be hereinafter explained.

On a rearward extension $b$ of the casting 2 is a bearing 44 in which is slidably and rotatably journaled a vertical spindle 45 forming part of a crank axle on the crank end of which is mounted the rear furrow wheel 46. On the end of the extension $b$ is pivotally supported a bell crank 47 which is reenforced by a brace 48 which is secured to the pivot of the bell crank and extends parallel with the latter to its rear termination and is securely bolted thereto. To the forward arm of the bell crank 47 a vertical rod 49 is pivotally attached, and the upper end of said rod is threaded and passes through the eye of a bolt 50 which fits loosely in a transverse hole in a cap 51 mounted on the upper end of the spindle 45, and is held therein by a pin or cotter. The cap 51 is held on the spindle 45 by a collar 52 rigidly secured on the spindle by a set screw 53 which extends through a horizontal slot 54 in the cap 51. The rod 49 is normally held against longitudinal movement through the eye of the bolt 50 by nuts $49^a$ screwed on said rod on opposite sides of said eyebolt, as best shown in Figures 2 and 3.

Pivotally connected to the rear arm of the bell crank 47 is a link 55 which extends forwardly to connection with a strap $f$ rigidly secured to an upstanding arm 56 preferably integral with the axle 42. Through its connection with the strap $f$ and arm 56 the link 55 is connected with a bar 60 which extends forwardly to pivotal attachment to an arm 61 which is part of a manually operable bent lever 62 pivotally mounted, adjacent to the bend of said lever, on a standard 63 rigidly secured on the shaft $a$. Preferably a link $61^a$ extends from the forward pivot of the bar 60 to the pivot of the lever 62, to serve as a reenforcing support for these parts. To the pivot of the lever 62 is secured a radius arm $c$ of a floating notched sector 64 which is further supported on vertical links 65 pivotally connected to the radius arm $c$ and to a bracket 66 on the casting 4. The lever 62 is provided with the usual type of latch to engage with the notches in the sector 64.

Extending forwardly from the casting 4 is an arm 67 with a forwardly upturned end carrying an eyebolt 68 to which is connected a coiled spring 69 the other end of which is connected to a loop 70 secured to the standard 63 at a distance from the rock shaft $a$.

The traction power of the landwheel 43 is utilized to raise the plow through the instrumentality of clutch mechanism comprising two members, $43^a$ and $43^b$, the member $43^a$ of which is fixed to the landwheel while the clutch member $43^b$ is loosely mounted on the inner end portion of the landwheel spindle and is adapted to be engaged at will with the other clutch member by the actuation of a controlling lever 71, suitably mounted on the axle 42 and adapted to be tripped from the drawing tractor by a cable 72. As best shown in Figure 1, a link 73 is pivotally connected with the marginal portion of the clutch member 43ᵇ and with an arm 74 preferably integral with the landward end of the rock shaft d and projecting forwardly and upwardly therefrom. The arrangement is such that when the clutch members are disconnected, the member 43ᵇ is held against rotation by the controlling lever 71, but when said lever is tripped, said clutch member is released and caused to operatively engage the clutch member 43ᵃ so that it is rotated by the landwheel, thereby, through the link 73, causing the axle 42 to rock so as to swing the landwheel backward and thereby lift the frame of the plow.

It will be apparent that the rock shaft d is normally held against rocking by reason of its connection through the bar e with the lever 37, which is locked to sector 39, and as the link 73 is connected by the arm 74 with said rock shaft, when the clutch member 43ᵇ with which the lower end of said link is connected, operatively engages the clutch member 43ᵃ as above described, said link and the parts associated with it, serve as an abutment against which the rotative effort of the land wheel acts so as to cause the axle 42 to swing rearwardly, thereby lifting the rear portion of the plow. At the same time the swinging of said axle rocks the arm 56 in a forward direction. This movement of the latter arm is transmitted through the bar 60 to the arm 61 of the lever 62, which however is locked to its sector 64, and consequently the result is that the standard 63 is swung forward thereby rocking the rock shaft a to lift the front end of the plow through its connection with the cap 33 at the upper end of the front furrow wheel spindle 16. The rocking of the arm 56 in the manner described also operates through the link 55 to swing bell crank 47 to raise the furrow wheel side of the rear end portion of the plow on the rear furrow wheel spindle in a similar manner. Thus the plow as a whole is lifted through the traction of the landwheel. The lifting operation is materially assisted by the coiled spring 69 and a similar spring 75 extended between a bracket 76 on the bell crank 47 and the lower end of the strap f below the axis of the axle 42.

As previously stated the standards are adjustable along the beam to vary the distance between the plows and consequently increase or lessen the width of the furrow. The casting 2 is also adjustable longitudinally of the beam 1 by loosening the bolts holding the beam in place between the block 5 and the cap 6 which adjustment is desirable when the number of plows, is increased or reduced. Figure 1 shows the plow equipped with three disks and Figure 2 shows it as having four disks. Longitudinal adjustment of the casting 2 will necessitate change in the length of the bars e and 60, and to that end I have made these two bars of lapped parts bolted together and provided with a sufficient number of holes to accommodate the change desired.

The landward bearing for the axle 42 consists of a bar 82 having a central eye 83 in which the axle 42 is rockably supported. The end portions of said bar are threaded, and its threaded ends extend loosely through holes 84 in opposite sides of the casting 2. Nuts 85 and 86, on the threaded portions of the bar 82 contact with the outer sides of the casting 2. By this construction it is evident that by loosening the nut 85 and tightening the nut 86 the landward end of the axle 42 may be adjusted rearwardly, swinging freely in its furrowward bearing, which is formed by the casting 2 and the cap piece 2ᵃ secured under the furrowward end portion of said axle by bolts 2ᵇ, as shown in Figures 1 and 3. The wheel 43 may then be moved to a slight angle to the line of draft sufficient to cause the plows to take more land, or if it is desired that the plows take less land the nut 86 is loosened as far as necessary, and the nut 85 is set up to the desired extent.

By means of the lever 37 the front and rear end portions of the plow may be vertically adjusted simultaneously to regulate the depth of plowing, since when said lever is operated it acts through the bar e to rock the rock shaft d, and as the arm 74 of said rock shaft is connected with the spindle portion of the axle 42 by the link 73, the rocking of said rock shaft acts to swing the axle 42 to raise or lower the frame of the plow relatively to the land wheel. At the same time the swinging of the axle 42 operates in the manner previously described to raise or lower the frame relatively to the front furrow wheel, this being permitted notwithstanding the fact that the lever 62 then remains locked, by the floating mounting of the sector 64. Furthermore, by means of the lever 62 the front portion of the plow is capable of independent vertical adjustment relatively to the front furrow wheel, for leveling purposes, as said lever may be independently operated to rock the standard 63 and rock shaft a. When the latter adjustment is made it does not affect the relation of the rear furrow wheel to the frame as the longitudinal movement of the bar 60 is insufficient to rock the arm 56 far enough to actuate the bell crank 47, owing to the pivoted link connection between said arm and said bell crank.

Steering the plow is effected by lateral swing of the draft bar, the front furrow wheel 17 freely following the lead of the draft bar through its connecting bars 19 and 26. The rear furrowwheel is held from swinging by a rod 78 secured to a bracket 79 on the casting 2 and to an arm 80 rigidly secured on a split sleeve 81 on the rear furrowwheel axle.

What I claim is—

1. In a plow the combination with a frame comprising a front frame member, a rear transverse member, and a plow carrying beam rigidly connecting said frame members, of a transversely disposed axle mounted on said rear frame member and having a crank at the landward end thereof, a bearing on said rear frame member for the furrowward end portion of said axle, means for adjusting the landward end portion of said axle fore and aft, a land wheel mounted on said crank, and means for rocking said axle.

2. In a plow, the combination with a frame comprising a beam, a rear transverse member secured to the rear portion of the beam, and a draft member secured to the forward portion of said beam, of a front furrow wheel on which the front portion of said frame is supported for vertical adjustment, a transversely-disposed crank axle journaled on said rear transverse member, bearings on said rear transverse member for the landward and furrowward end portions of said crank axle, a land wheel mounted on said crank axle, means actuated by the rocking of said crank axle for adjusting the frame vertically relatively to said front furrow wheel, means for rocking said axle, and means for adjusting the landward bearing of said crank axle fore and aft.

3. In a plow, the combination with a frame comprising a beam, a rear transverse member secured to the rear portion of said beam, and a draft member secured to the front portion of said beam, of a front furrow wheel on which the front portion of said frame is supported for vertical adjustment, a transversely-disposed crank axle journaled on said rear transverse member, bearings on said rear transverse member for the landward and furrowward end potions of said crank axle, a land wheel mounted on said crank axle, a rear furrow wheel supporting the rear portion of the frame for vertical adjustment, means actuated by the rocking of said crank axle for adjusting the frame vertically relatively to said furrow wheels, means for rocking said axle, and means for adjusting the landward bearing of said crank axle fore and aft.

4. In a plow, the combination with a frame comprising a front transverse draft member, a rear transverse member, and a beam connected with said transverse members, of a front furrow wheel on which the front portion of said frame is supported for vertical adjustment, a transversely-disposed crank axle journaled on said rear transverse member, bearings on said rear transverse member for the landward and furrowward end portions of said crank axle, a land wheel mounted on said crank axle, a rear furrow wheel on which said rear transverse member is supported for vertical adjustment, means actuated by the rocking of said crank axle for adjusting the frame vertically relatively to said furrow wheels, means for rocking said axle, and means for adjusting the landward bearing of said crank axle fore and aft.

5. In a plow, the combination with a frame comprising a front transverse draft member, a rear transverse member, and a beam connected with said transverse members, of a front furrow wheel on which the front portion of said frame is supported for vertical adjustment, a transversely-disposed crank axle journaled on said rear transverse member, bearings on said rear transverse member for the landward and furrowward end portions of said crank axle, a land wheel mounted on said crank axle, a rear furrow wheel on which said rear transverse member is supported for vertical adjustment, means connected with the furrowward end portion of said crank axle and actuated by the rocking thereof to adjust the frame vertically relatively to said furrow wheels, means for rocking said axle, and means for adjusting the landward bearing of said crank axle fore and aft.

6. In a gang plow, having in combination a frame, forward and rear furrow-wheels, a crank axle extending transversely of the frame and supported in bearings thereon, the landward bearing of said axle comprising a bar having a central eye in which the axle is journaled, said bar extending in opposite directions from the eye through openings in the frame and threaded at its ends, and nuts on said threaded parts operable to move said bar longitudinally.

7. In a plow, the combination with a frame comprising a front frame member, a rear frame member, and a beam connected with said frame members, of a front furrow wheel on which the front portion of said frame is supported for vertical adjustment, a transversely disposed crank axle journaled on said rear frame member, a land wheel mounted on said crank axle, a rocking element mounted on said rear frame member, manually operable means supported at the front of the frame and connected with said rocking element for rocking the same, and means connecting said rocking element with said crank axle for rocking the latter by the rocking of said rocking element, or for rocking said crank axle relatively to said rocking element.

8. In a plow, the combination with a frame comprising a front frame member, a rear frame member, and a beam connected with said frame members, of a front furrow wheel on which the front portion of said frame is supported for vertical adjustment, a transversely disposed crank axle journaled on said rear frame member, a land wheel mounted on said crank axle, a rock-shaft mounted on said rear frame member, a manually operable lever supported at the front of the frame and connected with said rock shaft for rocking the same, locking means for said lever, and means connecting said rock-shaft with said crank axle for rocking the latter by the rocking of said rock-shaft.

9. In a plow, the combination with a frame comprising a front frame member, a rear frame member, and a beam connected with said frame members, of a front furrow wheel supporting said front frame member for vertical adjustment, a transversely disposed axle journaled on said rear frame member and having a crank at the landward end thereof, a land wheel mounted on said crank, a rocking element mounted on said rear frame member, connections between the land wheel, said crank and said rocking element operable alternatively to effect rocking of the axle relatively to said rocking element, or to effect rocking of said axle by the rocking of said rocking element, means actuated by the rocking of said axle for moving the front frame member vertically relatively to said furrow wheel, and means supported at the front of the frame and connected with said rocking element for rocking the same.

10. In a plow, the combination with a frame comprising a front frame member, a rear frame member, and a beam connected with said frame members, of a front furrow wheel supporting said front frame member for vertical adjustment, a transversely disposed axle journaled on said rear frame member and having a crank at the landward end thereof, a land wheel mounted on said crank, a rocking element mounted on said rear frame member, connections between the land wheel, said crank and said rocking element operable alternatively to effect rocking of the axle relatively to said rocking element, or to effect rocking of said axle by the rocking of said rocking element, means actuated by the rocking of said axle for moving the front frame member vertically relatively to said furrow wheel, means supported at the front of the frame and connected with said rocking element for rocking the same, a rear furrow wheel supporting the frame for vertical adjustment, and means actuated by the rocking of said axle for vertically adjusting the frame relatively to said rear furrow wheel.

11. In a plow, the combination with a frame comprising a front frame member, a rear frame member, and a beam connected with said frame members, of a front furrow wheel on which the front portion of said frame is supported for vertical adjustment, a transversely-disposed crank axle journaled on said rear frame member, a land wheel mounted on said crank axle, a rear furrow wheel supporting the frame at the rear for vertical adjustment, a rocking element mounted on said rear frame member, manually operable means supported at the front of the frame, and connected with said rocking element for rocking the same, means connecting said rocking element with said crank axle for rocking the latter by the rocking of said rocking element, or for rocking said crank axle relatively to said rocking element, and means actuated by the rocking of said crank axle for vertically adjusting the frame relatively to said furrow wheels.

12. In a plow, the combination with a frame comprising a front frame member, a rear frame member, and a beam connected with said frame members, of a front furrow wheel on which the front portion of said frame is supported for vertical adjustment, a transversely-disposed crank axle journaled on said rear frame member, a land wheel mounted on said crank axle, a rear furrow wheel on which said rear frame member is supported for vertical adjustment, a rock-shaft mounted on said rear frame member, a lever supported by said front frame member and operable to rock said rock-shaft, locking means for said lever, means connecting said rock-shaft with said crank axle and operable to rock the latter by the rocking of said rock-shaft, or to rock said crank axle relatively to said rock-shaft, and means actuated by the rocking of said crank axle for vertically adjusting the frame relatively to said furrow wheels.

13. In a plow, the combination with a frame comprising a front frame member, a rear frame member, and means rigidly connecting said members, of a front furrow wheel supporting said front frame member for vertical adjustment, a rear furrow wheel supporting said rear frame member for vertical adjustment, a transversely disposed axle mounted on said rear frame member and having a crank at the landward end thereof, a land wheel mounted on said crank, a front rock-shaft mounted on said front frame member, means actuated by the rocking of said rock-shaft for vertically adjusting the frame on said front furrow wheel, a rock-shaft mounted on said rear frame member, connections between the land wheel, said axle and said rear rock-shaft, operable, alternatively, to effect rocking of the axle relatively to said rear rock shaft, or to effect rocking of said axle by the rocking of said rear rock-shaft, means actuated by the rocking of said axle for rocking said first-mentioned rock-shaft and for vertically adjusting said rear frame member on said rear furrow wheel, manually operable means supported by said front frame member for rocking said rear rock-shaft, means for normally holding said rear rock-shaft against rocking, and manually operable means for rocking said front rock-shaft independently of said rear rock-shaft.

14. In a plow, the combination with a frame comprising a front frame member, a rear frame member, and a beam connected with said frame members, of a front furrow wheel on which the front portion of said frame is supported for vertical adjustment, a transversely-disposed crank axle journaled on said rear frame member, a land wheel mounted on said crank axle, a rear furrow wheel on which said rear frame member is supported for vertical adjustment, a rocking element mounted on said rear frame member, means supported by said front frame member and operable to rock said rocking element, means connecting said rocking element with said crank axle for rocking the latter by the rocking of said rocking element, or for rocking said crank axle relatively to said rocking element, means actuated by the rocking of said crank axle for vertically adjusting the frame relatively to said front furrow wheel comprising a standard supported by said front frame member to swing fore and aft, a lever fulcrumed on said standard, an operating connection between said lever and said crank axle, and means for locking said lever in its different positions of adjustment, and means actuated by the rocking of said crank axle for vertically adjusting the rear frame member relatively to said rear furrow wheel.

15. In a plow, the combination with a frame comprising a front frame member, a rear frame member, and a beam connected with said frame members, of a front rock-shaft supported on the front part of said frame, a front furrow wheel on which said frame is supported for vertical adjustment, lifting connections between said rock-shaft and said furrow wheel operable to adjust the frame vertically with reference to said furrow wheel, a transversely disposed crank axle journaled on said rear frame member, a land wheel mounted on said crank axle, a rear furrow wheel supporting the rear portion of the frame, a rocking element mounted on said rear frame member, means supported by said front frame member and operable to rock said rocking element, means connecting said rocking element with said crank axle for rocking the same by the rocking of said rocking element, or for rocking said crank axle relatively to said rocking element, means actuated by the rocking of said crank axle for vertically adjusting the frame relatively to said front furrow wheel comprising a standard fixed to said front rock-shaft, a lever fulcrumed on said standard, means operatively connecting said lever with said crank axle, whereby by the rocking of said crank axle said lever will be actuated to rock said rock-shaft, and a floating sector supported by said front frame member and associated with said lever for locking it in its different positions of adjustment, and means actuated by the rocking of said crank axle for vertically adjusting the frame relatively to said rear furrow wheel.

16. In a plow, the combination with a frame comprising a front frame member, a rear frame member, and a beam connected with said frame members, of a front rock-shaft supported on the front part of said frame, a front furrow wheel on which the front portion of said frame is supported for vertical adjustment, lifting connections between said rock-shaft and said furrow wheel operable to adjust the frame vertically with reference to said furrow wheel, a transversely-disposed crank axle journaled on said rear frame member, a land wheel mounted on said crank axle, a rear furrow wheel supporting the rear portion of the frame, a rear rock-shaft mounted on said rear frame member, means supported by said front frame member and operable to rock said rear rock-shaft, means connecting the latter rock-shaft with said crank axle for rocking the same by the rocking of said rear rock-shaft, or for rocking said crank axle relatively to the latter rock-shaft, and means actuated by the rocking of said crank axle for vertically adjusting the frame relatively to said front furrow wheel comprising a standard fixed to said front rock-shaft, a lever fulcrumed on said standard, means operatively connecting said lever with said crank axle, whereby by the rocking of said crank axle said lever will be actuated to rock said front rock-shaft, and a floating sector supported by said front frame member and associated with said lever for locking it in its different positions of adjustment.

17. In a plow, the combination with a frame comprising a front frame member, a rear frame member, and a beam connected with said frame members, of a front rock-shaft supported on the front part of said frame, a front furrow wheel on which the front portion of said frame is supported for vertical adjustment, lifting connections between said rock-shaft and said furrow wheel operable to adjust the frame vertically with reference to said furrow wheel, a transversely-disposed crank axle journaled on said rear frame member, a land wheel mounted on said crank axle, a rear furrow wheel on which the rear portion of the frame is supported for vertical adjustment, a rear rock-shaft mounted on said rear frame member, means supported by said front frame member and operable to rock said rear rock-shaft, means connecting the latter rock-shaft with said crank axle for rocking the same by the rocking of said rear rock-shaft, or for rocking the crank axle relatively to the latter rock-shaft, and means actuated by the rocking of said crank axle for vertically adjusting the frame relatively to said front furrow wheel comprising a standard fixed to said front rock-shaft, a lever fulcrumed on said standard, means operatively connecting said lever with said crank axle, whereby by the rocking of said crank axle said lever will be actuated to rock said front rock-shaft, a floating sector supported by said front frame member and associated with said lever for locking it in its different positions of adjustment, and means actuated by the rocking of said crank axle for adjusting the frame vertically relatively to said rear furrow wheel.

18. In a plow, the combination with a frame comprising a front frame member, a rear frame member, and a plow carrying beam connecting said frame members, said rear frame member being adjustable toward and from said front frame member, of a front furrow wheel, means supporting said front frame member on said furrow wheel and operable to adjust the latter frame member vertically, a transversely disposed axle mounted on said rear frame member and having a crank at the landward end thereof, a land wheel mounted on said crank, means for rocking said axle to adjust said rear frame member vertically, and longitudinally adjustable means operated by the rocking of said axle to actuate said front frame member supporting means to move said front frame member vertically relatively to said furrow wheel.

19. In a plow, the combination with a frame comprising a front frame member, a rear frame member, and a plow carrying beam connecting said frame members, said rear frame member being adjustable toward and from said front frame member, of a front furrow wheel, means supporting said front frame member on said furrow wheel and operable to adjust the latter frame member vertically, a transversely disposed axle mounted on said rear frame member and having a crank at the landward end thereof, a land wheel mounted on said crank, means for rocking said axle to adjust said rear frame member vertically, longitudinally adjustable means operated by the rocking of said axle to actuate said front frame member supporting means to move said front frame member vertically relatively to said furrow wheel, and a rear furrow wheel supporting said rear frame member and adjustable therewith.

20. In a plow, the combination with a frame comprising a front frame member, a rear frame member, and a plow carrying beam connecting said frame members, said rear frame member being adjustable toward and from said front frame member, of a front furrow wheel, means supporting said front frame member on said furrow wheel and operable to adjust the latter frame member vertically, a transversely disposed axle mounted on said rear frame member and having a crank at the landward end thereof, a land wheel mounted on said crank, a depth adjusting member supported at the front of the frame, means mounted on the rear frame member and having a longitudinally adjustable connection with said depth adjusting member and operable thereby to rock said axle to vary the depth of plowing, means for rocking said axle to adjust said rear frame member vertically, and longitudinally adjustable means operated by the rocking of said axle to actuate said front frame member supporting means to move said front frame member vertically relatively to said furrow wheel.

21. In a plow, the combination with a frame comprising a front frame member, a rear frame member, and a plow carrying beam connecting said frame members, said rear frame member being adjustable toward and from said front frame member, of a front furrow wheel supporting said front frame member, a manually operable depth adjusting member at the front of the frame, a transversely disposed axle mounted on said rear frame member and having a crank at the landward end thereof, a land wheel mounted on said crank, a rocking element mounted on said rear frame member, means adapted to be actuated to rock said axle relatively to said rocking element, or to rock said axle by the rocking of said rocking element, and a longitudinally adjustable operating connection between said depth adjusting member and said rocking element.

22. In a plow, the combination with a frame comprising a front frame member, a rear frame member, and a plow carrying beam connecting said frame members, said rear frame member being adjustable toward and from said front frame member, of a front furrow wheel, means supporting said front frame member on said front furrow wheel and operable to adjust the latter frame member vertically, a transversely disposed axle mounted on said rear frame member and having a crank at the landward end thereof, a land wheel mounted on said crank, a rock-shaft mounted on said rear frame member, means adapted to be operated to rock said axle relatively to said rock shaft, or to rock said axle by the rocking of said rock shaft, longitudinally adjustable means operated by the rocking of said axle to actuate said front frame member supporting means to move said front frame member vertically relatively to said furrow wheel, and manually operable means mounted at the front of the frame and having a longitudinally adjustable connection with said rock-shaft, for rocking the same to regulate the depth of plowing.

23. In a plow, the combination with a front frame member, a diagonally-disposed beam connected with said frame member, and a rear frame member clamped to said beam and adjustable longitudinally thereof, of a front furrow wheel supporting the front portion of the frame for vertical adjustment, a rear furrow wheel supporting said rear frame member, a transversely-disposed crank axle journaled on said rear frame member, a land wheel mounted on said crank axle, a rock-shaft carried by said rear frame member, means connecting said rock-shaft with said crank axle for rocking said crank axle by the rocking of said rock-shaft, or for rocking said crank axle relatively to said rock-shaft, means supported by the front frame member and operable to rock said rock-shaft, an extensible connection between the latter means and said rock-shaft, devices operable to adjust the frame vertically relatively to said front furrow wheel, and an extensible connection between said crank axle and said devices, for actuating the same by the rocking of said crank axle.

24. In a plow, the combination with a front frame member, a diagonally-disposed beam connected with said frame member, and a rear frame member clamped to said beam and adjustable longitudinally thereof, of a front furrow wheel supporting the front portion of the frame for vertical adjustment, a rear furrow wheel supporting said rear frame member for vertical adjustment, a transversely-disposed crank axle journaled on said rear frame member, a land wheel mounted on said crank axle, a rock-shaft carried by said rear frame member, means connecting said rock-shaft with said crank axle for rocking said crank axle by the rocking of said rock-shaft, or for rocking said crank axle relatively to said rock-shaft, means supported by the front frame member and operable to rock said rock-shaft, an extensible connection between the latter means and said rock-shaft, a lever operable to adjust the frame vertically relatively to said front furrow wheel, an extensible connection between said crank axle and said lever, for actuating the same by the rocking of said crank axle, and means actuated by said crank axle for adjusting the frame vertically relatively to the rear furrow wheel.

25. In a plow, the combination with a front frame draft member, a diagonally-disposed beam connected with said frame member, and a rear frame member clamped to said beam and adjustable longitudinally thereof, of a front furrow wheel supporting the front portion of the frame for vertical adjustment, a rear furrow wheel supporting said rear frame member, a transversely-disposed crank axle journaled on said rear frame member, a land wheel mounted on said crank axle, a rock-shaft carried by said rear frame member, means connecting said rock-shaft with said crank-axle for rocking said crank axle by the rocking of said rock-shaft, or for rocking said crank axle relatively to said rock shaft, means supported by the front frame member and operable to rock said rock-shaft, an extensible connection between the latter means and said rock-shaft, devices operable to adjust the frame vertically relatively to said front furrow wheel, an extensible connection between said crank axle and said devices, for actuating the same by the rocking of said crank axle, and plow-carrying standards clamped to said beam and adjustable longitudinally thereof.

26. In a plow, the combination with a front frame draft member, a diagonally-disposed beam connected with said frame member, and a rear frame member clamped to said beam and adjustable longitudinally thereof, of a front furrow wheel supporting the front portion of the frame for vertical adjustment, a rear furrow wheel supporting said rear frame member for vertical adjustment, a transversely-disposed crank axle journaled on said rear frame member, a land wheel mounted on said crank axle, a rock-shaft carried by said rear frame member, means connecting said rock-shaft with said crank-axle for rocking said crank-axle by the rocking of said rock-shaft, or for rocking said crank axle relatively to said rock-shaft, means supported by the front frame member and operable to rock said rock-shaft, an extensible connection between the latter means and said rock-shaft, a lever supported by the front portion of the frame and operable to adjust the frame vertically relatively to said front furrow wheel, an extensible connection between said crank axle and said lever for actuating the same by the rocking of said crank axle, means supported by the rear portion of the frame and arranged to be operated by said crank axle to adjust the frame vertically relatively to the rear furrow wheel, and plow-carrying standards clamped to said beam and adjustable longitudinally thereof.

JOHN V. HOLSTEIN.